G. PELHAM.
AUTOMOBILE HEADLIGHT.
APPLICATION FILED OCT. 29, 1915.
1,171,237.
Patented Feb. 8, 1916.
2 SHEETS—SHEET 1.
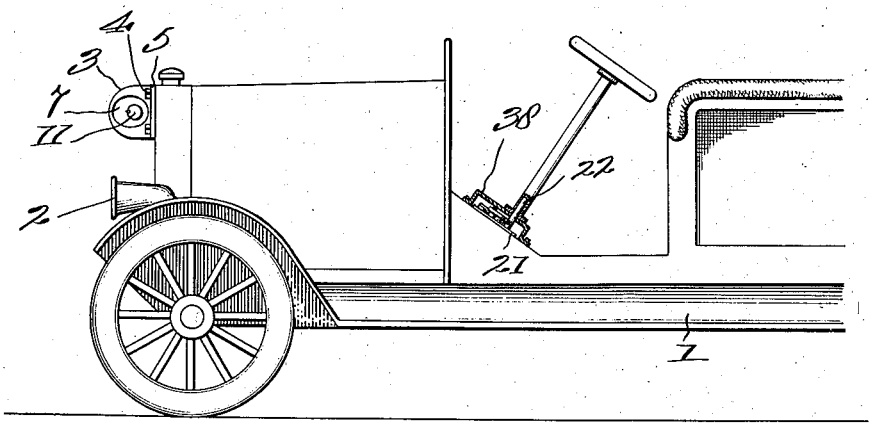
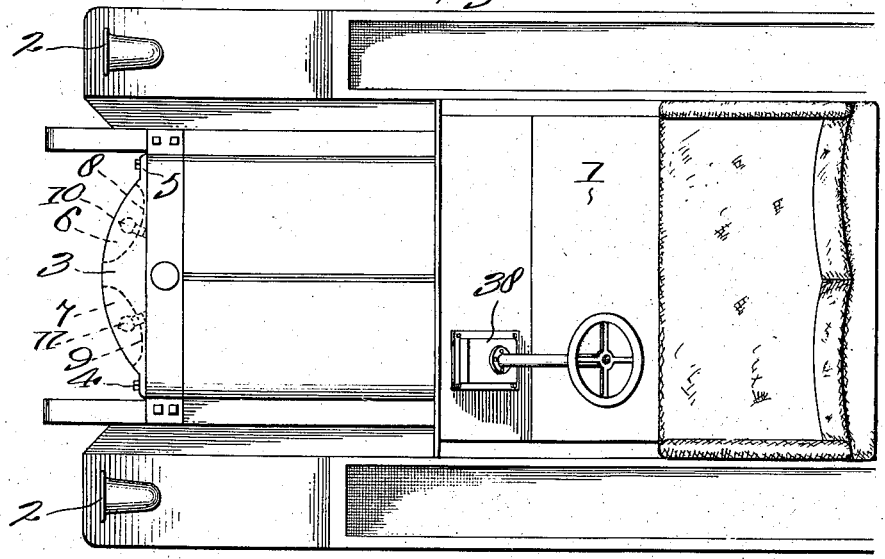
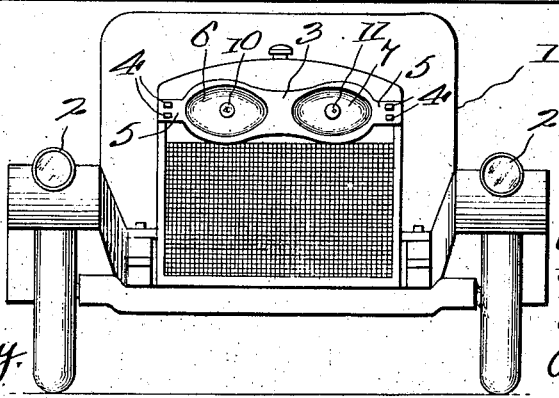
Witnesses
Edwin J. Beller
R. J. Mashinney
Inventor
George Pelham,
by Wilkinson
Justa MacKay
Attorneys G. PELHAM.
AUTOMOBILE HEADLIGHT.
APPLICATION FILED OCT. 29, 1915.
1,171,237.
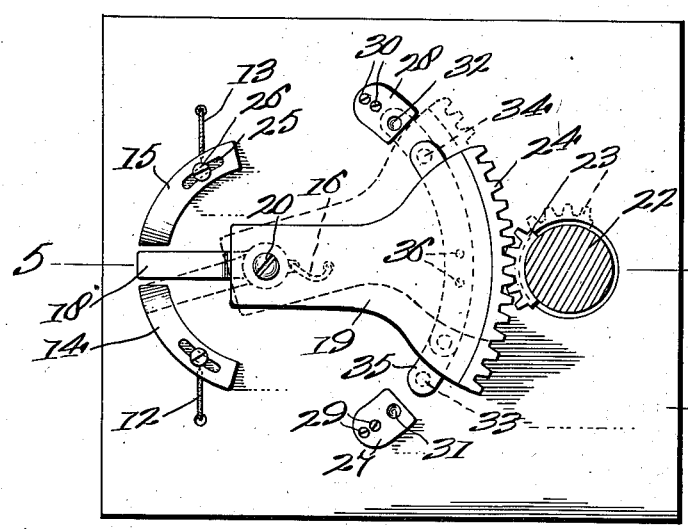
Fig. 4.
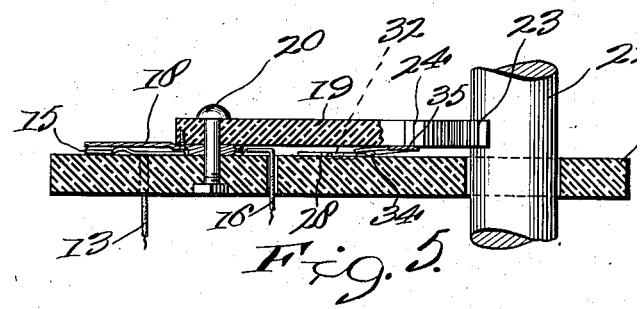
Fig. 5.
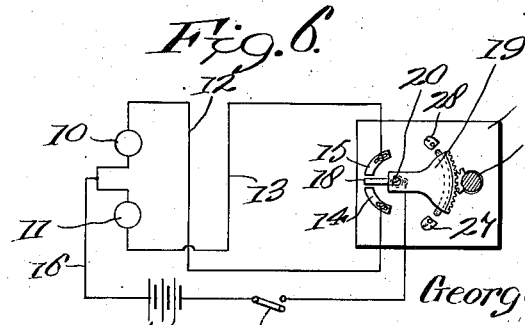
Fig. 6.

UNITED STATES PATENT OFFICE.

GEORGE PELHAM, OF LEAD, SOUTH DAKOTA, ASSIGNOR OF ONE-HALF TO CHAMBERS KELLAR, OF LEAD, SOUTH DAKOTA.

AUTOMOBILE-HEADLIGHT.

1,171,237.  Specification of Letters Patent.  Patented Feb. 8, 1916.

Application filed October 29, 1915. Serial No. 58,617.

*To all whom it may concern:*

Be it known that I, GEORGE PELHAM, a citizen of the United States, residing at Lead, in the county of Lawrence and State of South Dakota, have invented certain new and useful Improvements in Automobile-Headlights; and I do hereby declare the following to be a full, clear, and exact description of the invention, such as will enable others skilled in the art to which it appertains to make and use the same.

The present invention relates to improvements in automobile head-lights, and consists more particularly in an improved attachment arranged to be removably secured to the front of an automobile or other vehicle and including a pair of divergently disposed lamps, auxiliary to the usual head-lights, for illuminating the road to either side in front of the vehicle when the vehicle is being turned.

It is an object of the present invention to provide an improved attachment of the above character which will be automatically operated from the movement of the steering gear in turning the vehicle, and the lamp structure will be preferably arranged in a single casing or block constructed for detachable mounting on the front of the vehicle radiator frame centrally between the main head-lights and at an elevation thereabove so that the divergent rays will not be intercepted by the forwardly directed rays of the main lamps.

A further object of the invention resides in providing an improved lamp attachment for vehicles including circuit closing means actuated from the steering gear for illuminating said lamps; and which means will be adjustable to illuminate the lamps at any period with reference to the turning of the vehicle, and which will be secured in position and against accidental displacement when the gear connections with the steering mechanism are disengaged.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a fragmentary side elevational view, partly in section, of a vehicle equipped with auxiliary lights constructed in accordance with the present invention. Fig. 2 is a fragmentary top plan view of the same. Fig. 3 is a front elevational view of the same. Fig. 4 is an enlarged top plan view, partly in section, of the switch operating mechanism. Fig. 5 is a vertical sectional view taken on the line 5—5 in Fig. 4; and Fig. 6 is a diagrammatic view of the circuit connections for the improved attachment.

Referring more particularly to the drawings, 1 designates generally an automobile or other vehicle, and 2 the usual head lamps thereon.

The improved attachment includes a casing, preferably constructed in one piece from a block 3, of suitable material, having a straight rear wall arranged to be fitted against the radiator framework or other suitable portion of the machine and removably attached thereto by bolts, or other means, 4, passing through perforated lugs 5 projecting from opposite sides and integral with the block 3.

As will be apparent more particularly from Fig. 2, the front wall of the block 3 is curved and the block is formed with divergently disposed recesses 6 and 7, the rear walls 8 and 9 of which are fitted with reflectors and lamps 10 and 11; the front of each of the recesses 6 and 7 being inclosed by suitable lenses. The recesses 6 and 7 are advantageously semi-elliptical in horizontal section, for which see Fig. 2; and hyperbolical in vertical section, as compare Figs. 1 and 3.

Referring now more particularly to Fig. 6, the lamps 10 and 11 are connected respectively by leads 12 and 13 to arcuate contact plates 14 and 15, forming one side of the lamp circuits; said circuits being completed through a common return 16 including a battery, or other source, 17, and a switch 18 in electrical connection with the return 16, and mounted to swing with a segment 19 pivoted, as indicated at 20 on a base board 21.

The steering shaft 22 is provided with a segmental pinion 23 normally meshing with a rack 24 on the segment 19, whereby the segment and switch 18 are shifted into engagement with either of the contact plates 14 and 15 when the vehicle is being turned in the corresponding direction. As shown in Fig. 5, the ends of each of the contact plates 14 and 15 are curved or inclined to readily receive the switch arm 18 and insure a good contact therewith. Slots 25 are produced in each of the contact plates 14 and 15 through which engage clamping screws 26 for permitting adjustment of said contact plates with respect to the central position that the switch arm 18 is shown occupying in Fig. 4; and whereby the period at which the lights 10 and 11 are switched in with reference to the turning of the vehicle may be regulated.

Plates 27 and 28 are secured by screws 29 and 30, or otherwise, to the base board 21, and are provided with sockets 31 and 32 for engaging complemental heads 33 and 34, respectively, on the ends of a flat spring 35 secured centrally to the segment 19, as indicated at 36, and having the free ends bent downwardly therefrom, as will appear on inspection of Fig. 5. In dotted lines in Fig. 4 the segment 19 and switch arm 18 are shown shifted to switch in the lamp 10 when the vehicle is being turned to the right, and the head 34 shown occupying the socket 32 in the plates 28; the segmental pinion 23 on the steering shaft 22 being thereupon released from the rack 24, permitting further operation of said shaft to negotiate a sharper turn without further shifting of the switch mechanism, which latter is held securely in position by the ball and socket latch, and which will be readily disengaged when the steering shaft is reversed and the gears reëngaged.

A switch 37 is interposed in the return 16 for cutting out the operation of the lamps 10 and 11 during the day-time, and said switch is adapted to be placed on the dash or instrument board of the vehicle. As shown more particularly in Figs. 1 and 2, the base board 21, carrying the various parts of the switch mechanism, is arranged to be mounted on the vehicle foot or instrument boards at the base of the steering post and may advantageously be inclosed by a housing 38.

From the foregoing description, taken in connection with the drawings, it will be obvious that as the steering shaft 22 is turned in either direction to turn the vehicle, the switch arm 18 will be shifted to engage one or the other of the contact 14 and 15 and close the circuit through the corresponding lamp 10 or 11, and thus illuminate the road about the corner. On reversing the steering shaft 22 for straight-ahead running, the switch arm 18 will be disengaged from the contact, interrupting the circuit, and will be brought to the intermediate position shown in full lines in Fig. 4.

It is obvious that the device may be readily mounted on any of the improved types of vehicle and connected up to the steering apparatus for automatic operation, and the same will be practical in avoiding accidents.

I am aware that auxiliary lamps have been mounted in connection with the vehicle head lamps for illumination only when the vehicle is being turned, notably U. S. Patent No. 1,080,110, granted December 2, 1913, to Howard and Wrigley, and entitled "Changeable head-lights," and I do not wish to be understood as broadly claiming this invention.

It is obvious that those skilled in the art may vary the details of construction and arrangements of parts without departing from the spirit of my invention, and therefore I do not wish to be limited to such features except as may be required by the claims.

I claim:

1. The combination with electric lamps, of circuits for said lamps including a pair of contacts, means for adjusting said contacts, a switch normally resting between said contacts and pivoted to swing to engage either one thereof, disengageable gear connections for actuating said switch, and means for maintaining said switch in shifted position during the disengagement of said gear connections, substantially as described.

2. A device as described including circuits, adjustable contacts in said circuits, a pivoted switch for swinging to engage said contacts, disengageable gear connections for actuating said switch, socket plates to either side of said switch, and spring-pressed heads on said switch for engaging said socket plates to temporarily maintain the switch in shifted position during the disengagement of said gear connections, substantially as described.

3. In a device of the character described, the combination of circuits, contacts included in said circuits, a switch normally at rest between said contacts and movable to engage either one thereof, a gear element associated with said switch, a second gear element normally in mesh with the switch gear element but disengageable therefrom, socket plates to either side of said switch element, a spring secured to said switch element, and heads on the ends of said spring for engaging said socket plates when the gear elements are disengaged to maintain the switch on the respective contact, substantially as described.

4. In a device of the character described, the combination of a rotatable post, a gear element on said post, a pivoted gear element meshing with said first-named gear element, a switch arm connected to move with said last-named gear element, contacts to either side of said switch arm, circuits including said contacts and switch arm, socket plates to either side of said pivoted gear element, and spring-pressed heads on said pivoted gear element for engaging the socket plates to maintain the switch arm on the respective contact when the first-named gear element disengages the pivoted element, substantially as described.

5. In a device of the character described, the combination of a pair of circuits, contacts included in said circuits, means for adjusting said contacts, a pivoted switch arm normally resting between said contacts and movable to engage either one thereof, a pivoted gear segment connected to move with said switch arm, a rotatable post, a